United States Patent Office 3,236,916
Patented Feb. 22, 1966

3,236,916
FLAME RESISTANT UNSATURATED POLYESTERS OF THE DIELS-ALDER ADDUCT OF HEXA-CHLOROCYCLOPENTADIENE AND AN UNSATURATED GLYCIDYL ETHER
Helmut Wulff, Witten (Ruhr), and Edith Dembski Behnke, Hamburg-Rissen, Germany, assignors to Chemische Werke Witten G.m.b.H., Witten (Ruhr), Germany
No Drawing. Filed Dec. 3, 1962, Ser. No. 241,543
Claims priority, application Germany, Dec. 6, 1961, C 25,678
9 Claims. (Cl. 260—869)

The present application relates to the production of flame-resistant molded plastic bodies by polymerizing unsaturated, and, if desired, halogen-containing, mixed polyesters and co-polymerizable monomeric compounds, containing halogens, if desired, wherein the mixture to be polymerized contains a Diels-Alder adduct of hexa-chlorocyclopentadiene and an unsaturated glycidyl ether and/or the condensation product thereof with an acidic halogen-containing unsaturated mixed polyester.

The preparation of flame-resistant molded bodies by polymerizing solutions of unsaturated, and, if desired, halogen-containing, mixed polyesters in monomeric compounds, which may be polymerized therewith, is known.

Such mixed polyesters may be prepared by polycondensation of $\alpha,\beta$-unsaturated, and, if desired, halogen-containing, dicarboxylic acids or their anhydrides, such as, for example, fumaric acid, maleic anhydride, dichloromaleic acid, etc., or saturated halogen-containing dicarboxylic acids, such as, for example, dichlorophthalic acid, dibromoisophthalic acid, dibromoterephthalic acid, tetrachlorophthalic acid, etc., with dihydric, and, if desired, halogen-containing alcohols such as, for example, ethylene glycol 1,2-propylene glycol, 1,3-butylene glycol, pentachlorophenylmonoglycerin ether, pentaerytheital-dichlorohydrin, etc., in the melt or azeotropically in a known manner. As already set forth, either the acid component or the alcohol constituent may thereby contain a halogen. More particularly, it is known to utilize Diels-Alder adducts of hexahalogencyclopentadiene with unsaturated polyhydric carboxylic acids, their anhydrides, and acid halides, or with unsaturated polyhydric alcohols or their esters as components of unsaturated mixed polyesters.

Such mixed polyesters are, however, only sufficiently liquid to allow the same to be dissolved in the monomers, which may be polymerized in the customary manner, only at temperatures above 150° C. It is necessary, therefore, to dissolve these mixed polyesters in the monomers, after cooling and grinding, as solid substances, which arrangement obviously creates difficulties. Further drawbacks consist in the high viscosity of such solutions and their considerably slower speed of hardening as compared with known, halogen-free mixed polyester solutions.

Also known are ethers or acid esters of polyhydric alcohols with at least three hydroxy groups, one of which is esterified and, respectively, etherified with an unsaturated alcohol or an acid. These react with hexa-halogencyclopentadiene in the dienesynthesis, for example, glycerin monoallyl ether, glycerin monovinyl ether, pentaerythritol diallyl ether, trimethylol monoallyl ether, etc.

The Diels-Alder adducts of these ethers have the disadvantage, however, that the ether bond may be easily split during polycondensation in the melt.

It has now been found that the above-mentioned disadvantages and shortcomings may be avoided when Diels-Alder adducts of hexahalogencyclopentadiene and unsaturated glycidyl ethers are used as components in the condensation of halogen-containing unsaturated mixed polyesters.

The acidic halogen-containing mixed polyesters to be used as starting materials according to the present invention may be obtained in a manner known per se by the reaction of unsaturated dicarboxylic acids or their anhydrides with dihydric alcohols in the melt, whereby at least one of the above-named components must contain halogen and whereby it is possible to utilize, besides unsaturated dicarboxylic acids, also halogen-containing unsaturated dicarboxylic acids and/or saturated dicarboxylic acids, or their anhydrides. As dicarboxylic acids and alcohols, such may be used, for example, as have been mentioned hereinabove in connection with the status of the prior art. The acidic mixed polyesters of the present invention contain a sufficient number of free carboxylic groups corresponding to an acid number of from 70 to 150, preferably from 70 to 100.

According to the present invention, the acidic halogen-containing unsaturated mixed polyesters are reacted in the melt in a further step with an amount, corresponding to the acid number of the mixed polyester, of a compound obtained by dienesynthesis of hexahalogencyclo-pentadiene and an unsaturated glycidyl ether, such as, for example, allyl glycidyl ether, methallyl glycidyl ether, chloroallyl glycidyl ether, crotyl glycidyl ether, etc., at temperatures below 150° C., preferably between 120 and 140° C. Under these mild conditions, the still-present carboxyl groups of the acidic halogen-containing, unsaturated, mixed polyester react with the epoxy groups of the Diels-Alder adduct, whereby the acid number of the reaction product is reduced to a desired low value. Since higher viscosities are expected with lower acid numbers, it is entirely discretionary to choose the viscosity and acid number suitable for the purpose intended. Conventionally, one skilled in the art would reduce the acid number to between about 40 and 15.

Thus, clear light-colored resins are obtained which, in contrast to the above-described known resins, are soluble in co-polymerizable, monomeric compounds and, if desired, halogen-containing monomeric compounds with considerably lower viscosity, and which may be rapidly polymerized in a known manner with conventional peroxide catalysts and, if desired, accelerators, to form transparent molded bodies. The molded bodies may be reinforced, if desired, with known filler materials, such as, for example, glass fibers. These molded bodies are flame-resistant, i.e., they extinguish by themselves within a short time after the removal of a pilot or igniting flame.

In order to increase this property of self-extinguishing, organic phosphorus compounds may be added in a manner known per se to the halogen-containing, unsaturated mixed polyester prepared according to the present invention. For example, trichloroethylene phosphate, triphenylphosphite, phenylphosphonate, and vinylphosphoric acid ester may be used. The use of these compounds is recommended particularly when the chlorine content of the mixtures to be polymerized is less than 25%.

The flame resistance may be also increased by increasing the halogen content of the molded bodies by polymerizing suitable halogen-containing monomeric compounds onto the halogen-containing mixed polyesters. Such compounds are, for example, monochlorostyrene, 2,4 - dichlorostyrene, 3,4 - dichlorostyrene, tetrachlorophthalic acid diallyl ester, etc. Particularly, however, Diels-Alder adducts of hexahalogencyclopentadiene with esters from $\alpha,\beta$-unsaturated dicarboxylic acids and unsaturated monohydric alcohols, for example, 1,4,5,6,7,7-hexachlorobicyclo - (2,2,1) - 5 - heptene - 2,3 - dicarboxylic acid diallyl ester may be used. Also, Diels-Alder adducts of hexahalogencyclopentadiene with esters of the acrylic or methacrylic acid may be used therefor.

According to another embodiment of the process according to the present invention, the Diels-Alder adducts of hexahalogencyclopentadiene and unsaturated glycidyl ethers may also be polymerized onto unsaturated, and, if desired, halogen-containing, mixed polyesters. It may be expedient to add to the solution a known monomeric compound such as styrene in order to adjust the viscosity of the mixture within desired limts. A casting resin must be more liquid than, for example, a resin to be pressed under heat, and the conventional resins are between about 500 and 5000 cp./20° C. although the limits may vary depending on the intended use of the resin.

A primary object of the present invention is, therefore, to provide improved flame-resistant molded plastic bodies.

Another object of the present invention is to improve the flame resistance of molded bodies by utilizing in the polymerization mixture therefor a Diels-Alder adduct of a hexahalogencyclopentadiene and an unsaturated glycidyl ether.

Further objects of the present invention will become apparent from the following examples which serve to illustrate the same and are not intended to limit the same.

EXAMPLE I 98 g. maleic anhydride, 429 g. tetrachlorophthalic anhydride and 170 g. 1,3-butylene glycol are heated to 205° C. within 5 hours while stirring and with carbon dioxide as a protective gas and are condensed at that temperature to an acid number of 70–75. After cooling of the batch to about 145° C., 288 g. of the Diels-Alder adduct from hexachlorocyclopentadiene and allyl glycidyl ether as well as 0.15 g. hydroquinone are added thereto, and the mixture is further condensed at 135–140° C. to an acid number of about 15. After cooling to about 120° C., the still liquid mixed polyester is dissolved in such an amount of styrene that the solution contains 30% styrene.

The light-yellow solution has a viscosity of about 1300 cp. at 20° C. When the resinous solution is polymerized with 1% benzoyl peroxide at 82.4° C. (SPI test), the gelling time is about 5 minutes, the hardening time about 9 minutes, and the peak temperature reached about 185° C.

A test strip of about 20 cm. long, 1 cm. wide, and 0.1–0.2 cm. thick and reinforced with glass fiber matting, which had been hardened for 35 minutes at 120° C., is self-extinguishing according to ASTM D 635–44.

EXAMPLE II

An acidic polyester condensed according to the process described in Example I from 98 g. maleic anhydride, 286 g. tetrachlorophthalic anhydride, 73 g. adipic acid and 170 g. 1,3-butylene glycol to an acid number of about 80 is reacted at about 145° C. with 288 g. of the Diels-Alder adduct from hexachlorocyclopentadiene and allyl glycidyl ether, 12 g. triphenyl phosphite and 0.15 g. hydroquinone and the reaction mixture is condensed at 120° C. to an acid number of about 30.

The mixed polyester is dissolved at 110 C. in such an amount of styrene that the solution contains 70% resinous substance.

Viscosity of the solution at 20° C. ____ 450 cp.
SPI test:
    gelling time _____ about 7 minutes.
    hardening time _____ about 12 minutes.
    maximum temperature _____ about 175° C.

A test specimen such as described in Example I is self-extinguishing in the test according to ASTM D 635–44.

EXAMPLE III

From a halogen-containing, unsaturated mixed polyester, precondensed from 98 g. maleic anhydride, 429 g. tetrachlorophathalic anhydride and 198 g. 1,3-butylene glycol according to Example I and reacted with 192 g. of the Diels-Alder adduct from hexachlorocyclopentadiene and allyl glycidyl ether, two mixtures are prepared with the following monomeric compounds:

|  | Mixture A | Mixture B |
| --- | --- | --- |
| Mixed polyester | 364 g. = 60% | 364 g. = 60% |
| Monostyrene | 78 g. = 15% | 104 g. = 20% |
| Diels-Alder adduct from hexachlorocyclopenradiene and allyl glycidyl ether | 78 g. = 15% | 52 g. = 10% |
|  | 520 g. = 100% | 520 g. = 100% |

The mixtures have the following properties:

|  | Mixture A | Mixture B |
| --- | --- | --- |
| Viscosity in cp./20° C | About 800 | About 500. |
| Acid number | About 24 | About 24. |
| Chlorine content, calculated percent | About 30 | About 27. |
| SPI test: |  |  |
|   Gelling time, min | About 3½ | About 3½. |
|   Hardening time | About 8 | About 8½. |
|   Maximum temp | 173° C | 179° C. |

The mixtures reinforced with glass fiber matting are hardened to test bands as described in Example I. The samples extinguish, according to ASTM D 635–44, directly after removal of the igniting flame.

While we have described several embodiments in accordance with the present invention, it is understood that the same is not limited thereto but is susceptible of many changes and modifications within the spirit and scope of the present invention and we, therefore, do not wish to be limited to the details described herein but intend to cover all such changes and modifications as are encompassed by the scope of the appended claims.

We claim:

1. A process for producing flame-resistant bodies comprising condensing an acidic unsaturated halogen-containing mixed polyester having an acid number of between approximately 70 and 150 with an amount essentially corresponding to the acid number of the mixed polyester of a Diels-Alder adduct of hexahalogencyclopentadiene and an unsaturated glycidyl ether at a temperature below approximately 150° C. whereby the carboxyl groups of the acidic mixed polyester react with the epoxy groups of the Diels-Alder adduct and the acid number of the reaction product is reduced, and polymerizing the product of said condensation with a copolymerizable monomeric compound.

2. A process for the preparation of flame-resistant bodies comprising condensing a mixture of an acidic, halogen-containing unsaturated mixed polyester having an acid number of between approximately 70 and 150 and a Diels-Alder adduct of hexachlorocyclopentadiene and an unsaturated glycidyl ether at a temperature below about 150° C., polymerizing the product of said condensation with a co-polymerizable monomeric compound, and allowing the product of said polymerization to stand for a period of time sufficient to harden the same.

3. A process as defined in claim 2, wherein the mixture being condensed contains an organic phosphorus compound.

4. A process as defined in claim 2, wherein said condensation product is polymerized with a co-polymerizable monomeric compound and a Diels-Alder adduct of hexachlorocyclopentadiene and an unsaturated glycidyl ether.

5. A process for producing flame-resistant bodies comprising condensing an acidic unsaturated halogen-containing mixed polyester having an acid number of between approximately 70 and 100 with an amount essentially corresponding to the acid number of the mixed polyester of a Diels-Alder adduct of hexahalogencyclopentadiene and an unsaturated glycidyl ether at a temperature between approximately 120 and 140° C. whereby the carboxyl groups of the acidic mixed polyester react with the epoxy groups of the Diels-Alder adduct and the acid number of the reaction product is reduced, and polymerizing said reaction product with a co-polymerizable monomeric compound.

6. In a process for the preparation of flame-resistant bodies by the polymerization of a mixture of an unsaturated mixed polyester and a co-polymerizable monomeric compound, the improvement comprising adding to the mixture to be polymerized a compound selected from the group consisting of the Diels-Alder adducts of hexachlorocyclopentadiene and unsaturated glycidyl ethers, the condensation products of said Diels-Alder adducts with acidic, halogen-containing, unsaturated mixed polyesters having an acid number of between approximately 70 and 150 obtained at temperatures below about 150° C., and mixtures thereof.

7. A process as defined in claim 6, wherein said adduct is the Diels-Alder adduct from hexachlorocyclopentadiene and allyl glycidyl ether.

8. The product of the process defined in claim 1.

9. The product of the process defined in claim 6.

References Cited by the Examiner

UNITED STATES PATENTS

| | | | |
|---|---|---|---|
| 2,822,340 | 2/1958 | McGovern et al. | 260—869 |
| 2,890,144 | 6/1959 | Robitscheck et al. | 260—869 |

FOREIGN PATENTS

| | | |
|---|---|---|
| 232,231 | 3/1959 | Australia. |
| 569,634 | 1/1959 | Canada. |

MURRAY TILLMAN, *Primary Examiner.*